US007789645B2

(12) United States Patent
Dubey et al.

(10) Patent No.: US 7,789,645 B2
(45) Date of Patent: Sep. 7, 2010

(54) MULTI-LAYER PROCESS AND APPARATUS FOR PRODUCING HIGH STRENGTH FIBER-REINFORCED STRUCTURAL CEMENTITIOUS PANELS

(75) Inventors: Ashish Dubey, Grayslake, IL (US); Joe W. Chambers, Lake Geneva, WI (US); Aaron Greengard, McHenry, IL (US); Alfred C. Li, Naperville, IL (US); D. Paul Miller, Lindenhurst, IL (US); Michael J. Porter, Hanover Park, IL (US)

(73) Assignee: United States Gypsum Company, Chicago, IL (US)

( * ) Notice: Subject to any disclaimer, the term of this patent is extended or adjusted under 35 U.S.C. 154(b) by 13 days.

(21) Appl. No.: 12/133,657

(22) Filed: Jun. 5, 2008

(65) Prior Publication Data

US 2009/0011212 A1 Jan. 8, 2009

Related U.S. Application Data

(62) Division of application No. 10/666,294, filed on Sep. 18, 2003, now Pat. No. 7,445,738.

(51) Int. Cl.
*B29C 39/20* (2006.01)
*B29C 70/06* (2006.01)

(52) U.S. Cl. ....................... 425/115; 425/130; 425/209; 425/308; 425/371; 425/447

(58) Field of Classification Search ................. 425/115, 425/130, 335, 363, 371, 373, 447, 209, 308
See application file for complete search history.

(56) References Cited

U.S. PATENT DOCUMENTS 2,446,644 A 8/1948 Fischer (Continued)

FOREIGN PATENT DOCUMENTS

JP 51115523 10/1976

OTHER PUBLICATIONS

Shah, Ludirdja, Daniel and Mobasher; Toughness-Durability of Glass Fiber Reinforced Concrete Systems; ACI Materials Journal, Sep.-Oct. 1988; pp. 352-360.

(Continued)

*Primary Examiner*—James Mackey
(74) *Attorney, Agent, or Firm*—Greer, Burns & Crain, Ltd.; David F. Janci, Esq.; Pradip Sahu, Esq.

(57) ABSTRACT

A structural cementitious panel, produced by a multi-layer process including providing a moving web; b. one of depositing a first layer of loose fibers upon the web and c. depositing a layer of settable slurry upon the web; d. depositing a second layer of loose fibers upon the slurry; e. embedding said second layer of fibers into the slurry; and f. repeating steps c. through e. until the desired number of layers of settable fiber-enhanced slurry in the panel is obtained. Also provided are an apparatus suitable for producing structural cementitious panels according to the present process, and a structural cementitious panel having multiple layers, each layer created by depositing a layer of settable slurry upon a moving web, depositing fibers upon the slurry and embedding the fibers into the slurry such that each layer is integrally formed with the adjacent layers.

4 Claims, 3 Drawing Sheets

U.S. PATENT DOCUMENTS

| | | | | |
|---|---|---|---|---|
| 3,115,431 | A | | 12/1963 | Stokes et al. |
| 3,214,311 | A | | 10/1965 | Schwab et al. |
| 3,271,215 | A | * | 9/1966 | Hoffman .................. 156/62.8 |
| 3,284,980 | A | | 11/1966 | Dinkel |
| 3,289,371 | A | | 12/1966 | Pearson et al. |
| 3,615,979 | A | | 10/1971 | Stay et al. |
| 3,895,988 | A | * | 7/1975 | Miller ........................ 156/245 |
| 3,957,556 | A | * | 5/1976 | Wilson et al. ................ 156/87 |
| 3,972,972 | A | | 8/1976 | Yano et al. |
| 4,194,946 | A | * | 3/1980 | Ootani et al. ............... 162/156 |
| 4,203,788 | A | | 5/1980 | Clear |
| 4,344,804 | A | | 8/1982 | Bijen et al. |
| 4,379,729 | A | | 4/1983 | Cross |
| 4,420,295 | A | | 12/1983 | Clear et al. |
| 4,450,022 | A | | 5/1984 | Galer |
| 4,450,128 | A | | 5/1984 | Takeuchi |
| 4,504,335 | A | | 3/1985 | Galer |
| RE32,037 | E | | 11/1985 | Clear |
| RE32,038 | E | | 11/1985 | Clear et al. |
| 4,666,029 | A | | 5/1987 | Bürkner |
| 4,778,718 | A | | 10/1988 | Nicholls |
| 4,793,892 | A | | 12/1988 | Miller et al. |
| 4,816,091 | A | | 3/1989 | Miller |
| 5,221,386 | A | | 6/1993 | Ensminger et al. |
| 5,685,903 | A | | 11/1997 | Stav et al. |
| 5,858,083 | A | | 1/1999 | Stav et al. |
| 5,958,131 | A | | 9/1999 | Asbridge et al. |
| 5,961,900 | A | | 10/1999 | Wedi |
| 6,176,920 | B1 | | 1/2001 | Murphy et al. |
| 6,986,812 | B2 | * | 1/2006 | Dubey et al. ................ 118/259 |
| 2001/0000738 | A1 | | 5/2001 | Mathieu |
| 2004/0084127 | A1 | | 5/2004 | Porter |
| 2004/0218462 | A1 | | 11/2004 | Stephens |
| 2004/0231916 | A1 | | 11/2004 | Englert et al. |
| 2005/0061237 | A1 | | 3/2005 | Dubey et al. |
| 2005/0064055 | A1 | | 3/2005 | Porter |
| 2005/0064164 | A1 | | 3/2005 | Dubey et al. |
| 2005/0121131 | A1 | | 6/2005 | Hennis et al. |
| 2005/0155689 | A1 | | 7/2005 | Smolenski |
| 2005/0219941 | A1 | | 10/2005 | Christenson et al. |
| 2006/0147681 | A1 | | 7/2006 | Dubey |
| 2006/0168906 | A1 | | 8/2006 | Tonyan et al. |
| 2006/0174572 | A1 | | 8/2006 | Tonyan et al. |

OTHER PUBLICATIONS

Mobasher and Shah; Test Parameters for Evaluating Toughness of Glass-Fiber Reinforced Concrete Panels; ACI Materials Journal, Sep.-Oct. 1989; pp. 448-458.

* cited by examiner

MULTI-LAYER PROCESS AND APPARATUS FOR PRODUCING HIGH STRENGTH FIBER-REINFORCED STRUCTURAL CEMENTITIOUS PANELS

CROSS REFERENCE TO RELATED APPLICATIONS

This application claims the benefit of 35 U.S.C. §120 as a Divisional Application of U.S. Ser. No. 10/666,294, filed Sep. 18, 2003 now U.S. Pat. No. 7,445,738.

This application is related to U.S. Pat. No. 6,986,812 entitled SLURRY FEED APPARATUS FOR FIBER-REINFORCED STRUCTURAL CEMENTITIOUS PANEL PRODUCTION and co-pending application U.S. Ser. No. 10/665,541 entitled EMBEDMENT DEVICE FOR FIBER-ENHANCED SLURRY, filed Sep. 18, 2003 and herein incorporated by reference.

FIELD OF THE INVENTION

This invention relates to a continuous process and related apparatus for producing structural panels using a settable slurry, and more specifically, to a process for manufacturing reinforced cementitious panels, referred to herein as structural cementitious panels (SCP) (also known as structural cement panels), in which discrete fibers are combined with a quick-setting slurry for providing flexural strength and toughness. The invention also relates to a SCP panel produced according to the present process.

Cementitious panels have been used in the construction industry to form the interior and exterior walls of residential and/or commercial structures. The advantages of such panels include resistance to moisture compared to standard gypsum-based wallboard. However, a drawback of such conventional panels is that they do not have sufficient structural strength to the extent that such panels may be comparable to, if not stronger than, structural plywood or oriented strand board (OSB).

Typically, the present state-of-the-art cementitious panels include at least one hardened cement or plaster composite layer between layers of a reinforcing or stabilizing material. In some instances, the reinforcing or stabilizing material is continuous fiberglass mesh or the equivalent, while in other instances, short, discrete fibers are used in the cementitious core as reinforcing material. In the former case, the mesh is usually applied from a roll in sheet fashion upon or between layers of settable slurry. Examples of production techniques used in conventional cementitious panels are provided in U.S. Pat. Nos. 4,420,295; 4,504,335 and 6,176,920, the contents of which are incorporated by reference herein. Further, other gypsum-cement compositions are disclosed generally in U.S. Pat. Nos. 5,685,903; 5,858,083 and 5,958,131.

One drawback of conventional processes for producing cementitious panels that utilize building up of multiple layers of slurry and discrete fibers to obtain desired panel thickness is that the discrete fibers introduced in the slurry in a mat or web form, are not properly and uniformly distributed in the slurry, and as such, the reinforcing properties that essentially result due to interaction between fibers and matrix vary through the thickness of the board, depending on the thickness of each board layer and a number of other variables. When insufficient penetration of the slurry through the fiber network occurs, poor bonding and interaction between the fibers and the matrix results, leading to low panel strength development. Also, in extreme cases when distinct layering of slurry and fibers occurs, improper bonding and inefficient distribution of fibers causes inefficient utilization of fibers, eventually leading to extremely poor panel strength development.

Another drawback of conventional processes for producing cementitious panels is that the resulting products are too costly and as such are not competitive with outdoor/structural plywood or oriented strand board (OSB).

One source of the relatively high cost of conventional cementitious panels is due to production line downtime caused by premature setting of the slurry, especially in particles or clumps which impair the appearance of the resulting board, and interfere with the efficiency of production equipment. Significant buildups of prematurely set slurry on production equipment require shutdowns of the production line, thus increasing the ultimate board cost.

Thus, there is a need for a process and/or a related apparatus for producing fiber-reinforced cementitious panels possessing structural which results in a board with structural properties comparable to structural plywood and OSB which reduces production line downtime due to prematurely set slurry particles. There is also a need for a process and/or a related apparatus for producing such structural cementitious panels which more efficiently uses component materials to reduce production costs over conventional production processes.

Furthermore, the above-described need for cementitious structural panels, also referred to as SCP's that are configured to behave in the construction environment similar to plywood and OSB, means that the panels are nailable and can be cut or worked using conventional saws and other conventional carpentry tools. Further, the SCP panels should meet building code standards for shear resistance, load capacity, water-induced expansion and resistance to combustion, as measured by recognized tests, such as ASTM E72, ASTM 661, ASTM C 1185 and ASTM E136 or equivalent, as applied to structural plywood sheets.

BRIEF DESCRIPTION OF THE INVENTION

The above-listed needs are met or exceeded by the present invention that features a multi-layer process for producing structural cementitious panels (SCP's or SCP panels), and SCP's produced by such a process. After one of an initial deposition of loosely distributed, chopped fibers or a layer of slurry upon a moving web, fibers are deposited upon the slurry layer. An embedment device mixes the recently deposited fibers into the slurry, after which additional layers of slurry, then chopped fibers are added, followed by more embedment. The process is repeated for each layer of the board, as desired. Upon completion, the board has a more evenly distributed fiber component, which results in relatively strong panels without the need for thick mats of reinforcing fibers, as are taught in prior art production techniques for cementitious panels.

More specifically, the invention relates to structural cementitious panels made by a multi-layer process, including: (a.) providing a moving web; (b.) one of depositing a first layer of loose fibers and (c.) depositing a layer of settable slurry upon the web; (d.) depositing a second layer of loose fibers upon the slurry; (e.) embedding said second layer of fibers into the slurry; and (f.) repeating the slurry deposition of step (c.) through step (d.) until the desired number of layers of settable fiber-enhanced slurry in the panel is obtained. Also provided is an apparatus suitable for producing structural cementitious panels according to the present process.

DETAILED DESCRIPTION OF THE INVENTION

Figure 1:
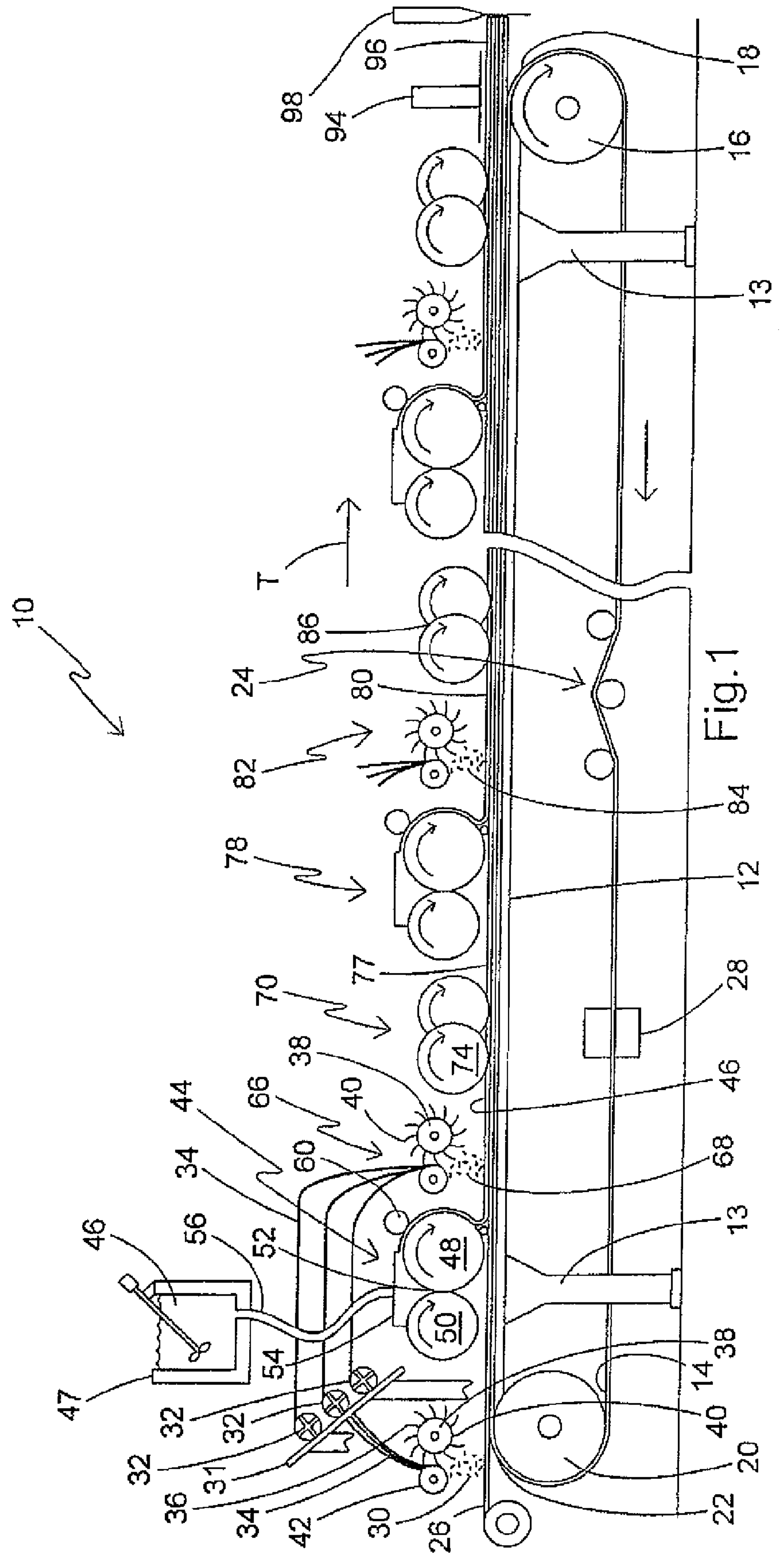
FIG. 1 is a diagrammatic elevational view of an apparatus which is suitable for performing the present process.

Referring now to FIG. 1, a structural panel production line is diagrammatically shown and is generally designated 10. The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13. The support frame 12 also includes a main drive roll 16 at a distal end 18 of the frame, and an idler roll 20 at a proximal end 22 of the frame. Also, at least one belt tracking and/or tensioning device 24 is preferably provided for maintaining a desired tension and positioning of the carrier 14 upon the rolls 16, 20.

Also, in the preferred embodiment, a web 26 of craft paper, release paper, and/or other webs of support material designed for supporting a slurry prior to setting, as is well known in the art, may be provided and laid upon the carrier 14 to protect it and/or keep it clean. However, it is also contemplated that the panels produced by the present line 10 are formed directly upon the carrier 14. In the latter situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 may vary to suit the application.

In the present invention, structural cementitious panel production is initiated by one of depositing a layer of loose, chopped fibers 30 or a layer of slurry upon the web 26. An advantage of depositing the fibers 30 before the first deposition of slurry is that fibers will be embedded near the outer surface of the resulting panel. A variety of fiber depositing and chopping devices are contemplated by the present line 10, however the preferred system employs at least one rack 31 holding several spools 32 of fiberglass cord, from each of which a cord 34 of fiber is fed to a chopping station or apparatus, also referred to as a chopper 36.

The chopper 36 includes a rotating bladed roll 38 from which project radially extending blades 40 extending transversely across the width of the carrier 14, and which is disposed in close, contacting, rotating relationship with an anvil roll 42. In the preferred embodiment, the bladed roll 38 and the anvil roll 42 are disposed in relatively close relationship such that the rotation of the bladed roll 38 also rotates the anvil roll 42, however the reverse is also contemplated. Also, the anvil roll 42 is preferably covered with a resilient support material against which the blades 40 chop the cords 34 into segments. The spacing of the blades 40 on the roll 38 determines the length of the chopped fibers. As is seen in FIG. 1, the chopper 36 is disposed above the carrier 14 near the proximal end 22 to maximize the productive use of the length of the production line 10. As the fiber cords 34 are chopped, the fibers 30 fall loosely upon the carrier web 26.

Next, a slurry feed station, or a slurry feeder 44 receives a supply of slurry 46 from a remote mixing location 47 such as a hopper, bin or the like. It is also contemplated that the process may begin with the initial deposition of slurry upon the carrier 14. While a variety of settable slurries are contemplated, the present process is particularly designed for producing structural cementitious panels. As such, the slurry is preferably comprised of varying amounts of Portland cement, gypsum, aggregate, water, accelerators, plasticizers, foaming agents, fillers and/or other ingredients well known in the art, and described in the patents listed above which have been incorporated by reference. The relative amounts of these ingredients, including the elimination of some of the above or the addition of others, may vary to suit the application.

While various configurations of slurry feeders 44 are contemplated which evenly deposit a thin layer of slurry 46 upon the moving carrier 14, the preferred slurry feeder 44 includes a main metering roll 48 disposed transversely to the direction of travel of the carrier 14. A companion or back up roll 50 is disposed in close parallel, rotational relationship to the metering roll 48 to form a nip 52 therebetween. A pair of sidewalls 54, preferably of non-stick material such as Teflon® brand material or the like, prevents slurry 46 poured into the nip 52 from escaping out the sides of the feeder 44.

An important feature of the present invention is that the feeder 44 deposits an even, relatively thin layer of the slurry 46 upon the moving carrier 14 or the carrier web 26. Suitable layer thicknesses range from about 0.05 inch to 0.20 inch. However, with four layers preferred in the preferred structural panel produced by the present process, and a suitable building panel being approximately 0.5 inch, an especially preferred slurry layer thickness is approximately 0.125 inch.

Figure 2:
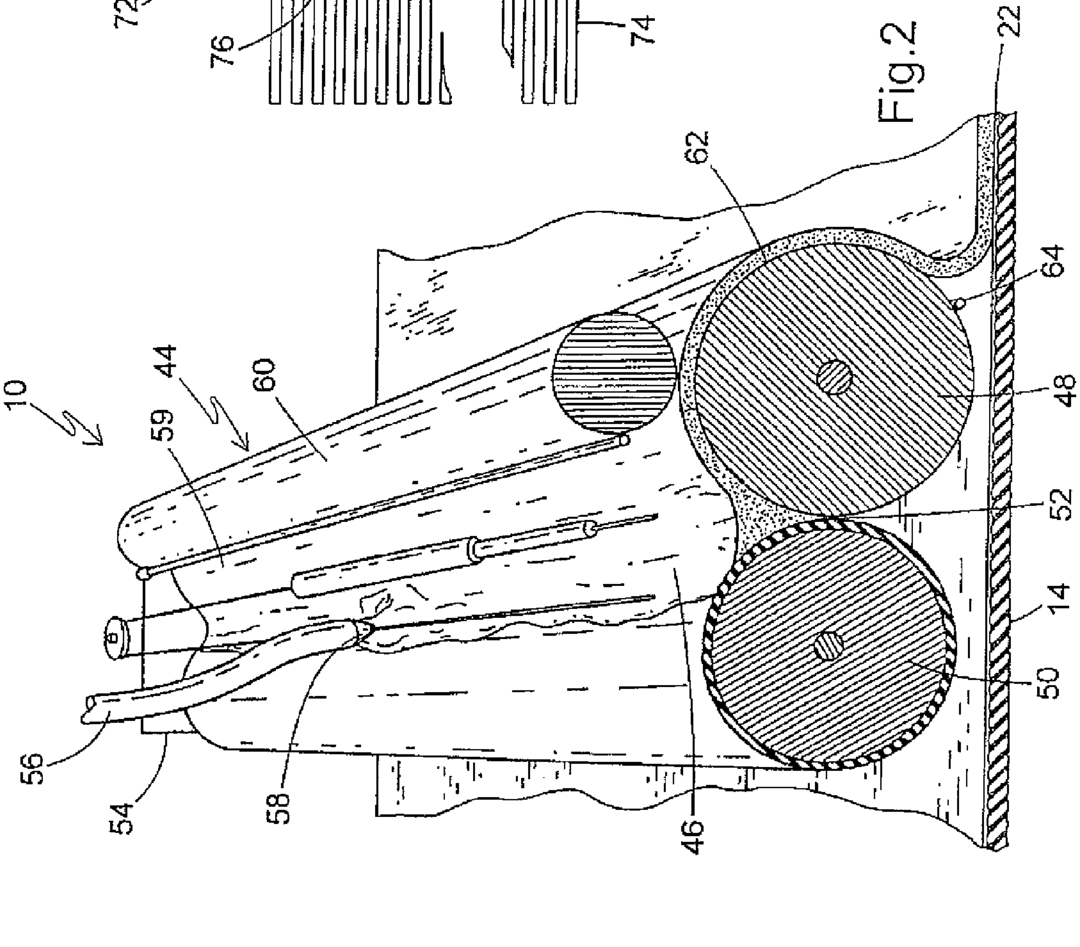
FIG. 2 is a perspective view of a slurry feed station of the type used in the present process.

Referring now to FIGS. 1 and 2, to achieve a slurry layer thickness as described above, several features are provided to the slurry feeder 44. First, to ensure a uniform disposition of the slurry 46 across the entire web 26, the slurry is delivered to the feeder 44 through a hose 56 located in a laterally reciprocating, cable driven, fluid powered dispenser 58 of the type well known in the art. Slurry flowing from the hose 56 is thus poured into the feeder 44 in a laterally reciprocating motion to fill a reservoir 59 defined by the rolls 48, 50 and the sidewalls 54. Rotation of the metering roll 48 thus draws a layer of the slurry 46 from the reservoir.

Next, a thickness monitoring or thickness control roll 60 is disposed slightly above and/or slightly downstream of a vertical centerline of the main metering roll 48 to regulate the thickness of the slurry 46 drawn from the feeder reservoir 59 upon an outer surface 62 of the main metering roll 48. Another related feature of the thickness control roll 60 is that it allows handling of slurries with different and constantly changing viscosities. The main metering roll 48 is driven in the same direction of travel 'T' as the direction of movement of the carrier 14 and the carrier web 26, and the main metering roll 48, the backup roll 50 and the thickness monitoring roll 60 are all rotatably driven in the same direction, which minimizes the opportunities for premature setting of slurry on the respective moving outer surfaces. As the slurry 46 on the outer surface 62 moves toward the carrier web 26, a transverse stripping wire 64 located between the main metering roll 48 and the carrier web 26 ensures that the slurry 46 is completely deposited upon the carrier web and does not proceed back up toward the nip 52 and the feeder reservoir 59. The stripping wire 64 also helps keep the main metering roll 48 free of prematurely setting slurry and maintains a relatively uniform curtain of slurry.

A second chopper station or apparatus 66, preferably identical to the chopper 36, is disposed downstream of the feeder 44 to deposit a second layer of fibers 68 upon the slurry 46. In the preferred embodiment, the chopper apparatus 66 is fed cords 34 from the same rack 31 that feeds the chopper 36. However, it is contemplated that separate racks 31 could be supplied to each individual chopper, depending on the application.

Figure 3:
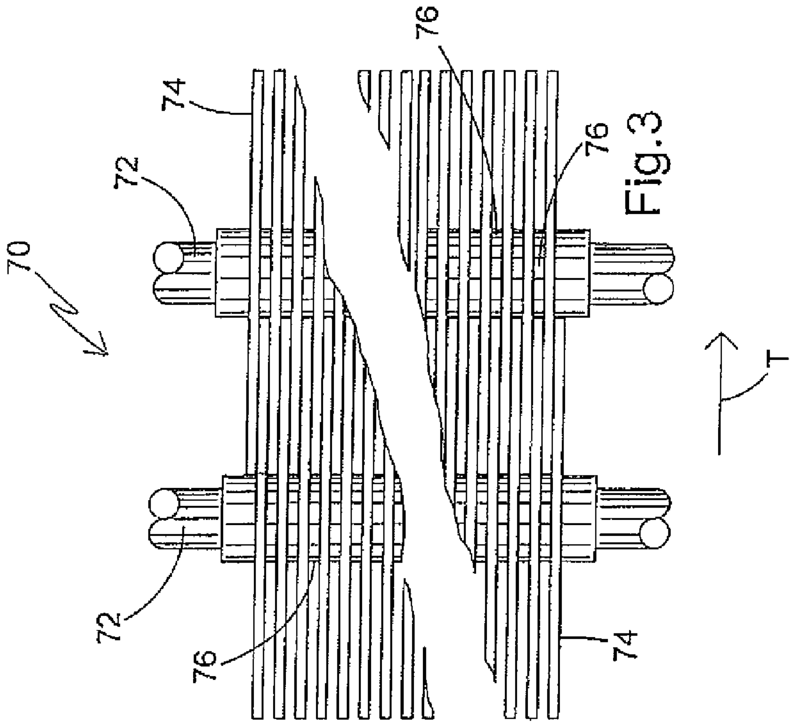
FIG. 3 is a fragmentary overhead plan view of an embedment device suitable for use with the present process.

Referring now to FIGS. 1 and 3, next, an embedment device, generally designated 70 is disposed in operational relationship to the slurry 46 and the moving carrier 14 of the production line 10 to embed the fibers 68 into the slurry 46. While a variety of embedment devices are contemplated, including, but not limited to vibrators, sheep's foot rollers and the like, in the preferred embodiment, the embedment device 70 includes at least a pair of generally parallel shafts 72 mounted transversely to the direction of travel 'T' of the carrier web 26 on the frame 12. Each shaft 72 is provided with a plurality of relatively large diameter disks 74 which are axially separated from each other on the shaft by small diameter disks 76.

During SCP panel production, the shafts 72 and the disks 74, 76 rotate together about the longitudinal axis of the shaft. As is well known in the art, either one or both of the shafts 72 may be powered, and if only one is powered, the other may be driven by belts, chains, gear drives or other known power transmission technologies to maintain a corresponding direction and speed to the driving roll. The respective disks 74, 76 of the adjacent, preferably parallel shafts 72 are intermeshed with each other for creating a "kneading" or "massaging" action in the slurry, which embeds the fibers 68 previously deposited thereon. In addition, the close, intermeshed and rotating relationship of the disks 74, 76 prevents the buildup of slurry 46 on the disks, and in effect creates a "self-cleaning" action which significantly reduces production line downtime due to premature setting of clumps of slurry.

The intermeshed relationship of the disks 74, 76 on the shafts 72 includes a closely adjacent disposition of opposing peripheries of the small diameter spacer disks 76 and the During SCP panel production, the shafts 72 and the disks 74, 76 rotate together about the longitudinal axis of the shaft. As is well known in the art, either one or both of the shafts 72 may be powered, and if only one is powered, the other may be driven by belts, chains, gear drives or other known power transmission technologies to maintain a corresponding direction and speed to the driving roll. The respective disks 74, 76 of the adjacent, preferably parallel shafts 72 are intermeshed with each other for creating a "kneading" or "massaging" action in the slurry, which embeds the fibers 68 previously deposited thereon. In addition, the close, intermeshed and rotating relationship of the disks 74, 76 prevents the buildup of slurry 46 on the disks, and in effect creates a "self-cleaning" action which significantly reduces production line downtime due to premature setting of clumps of slurry.

As the disks 74, 76 rotate relative to each other in close proximity (but preferably in the same direction), it is difficult for particles of slurry to become caught in the apparatus and prematurely set. By providing two sets of disks 74 which are laterally offset relative to each other, the slurry 46 is subjected to multiple acts of disruption, creating a "kneading" action which further embeds the fibers 68 in the slurry 46.

Once the fibers 68 have been embedded, or in other words, as the moving carrier web 26 passes the embedment device 70, a first layer 77 of the SCP panel is complete. In the preferred embodiment, the height or thickness of the first layer 77 is in the approximate range of 0.05-0.20 inches. This range has been found to provide the desired strength and rigidity when combined with like layers in a SCP panel. However, other thicknesses are contemplated depending on the application.

To build a structural cementitious panel of desired thickness, additional layers are needed. To that end, a second slurry feeder 78, which is substantially identical to the feeder 44, is provided in operational relationship to the moving carrier 14, and is disposed for deposition of an additional layer 80 of the slurry 46 upon the existing layer 77.

Next, an additional chopper 82, substantially identical to the choppers 36 and 66, is provided in operational relationship to the frame 12 to deposit a third layer of fibers 84 provided from a rack (not shown) constructed and disposed relative to the frame 12 in similar fashion to the rack 31. The fibers 84 are deposited upon the slurry layer 80 and are embedded using a second embedment device 86. Similar in construction and arrangement to the embedment device 70, the second embedment device 86 is mounted slightly higher relative to the moving carrier web 14 so that the first layer 77 is not disturbed. In this manner, the second layer 80 of slurry and embedded fibers is created.

Figure 4:
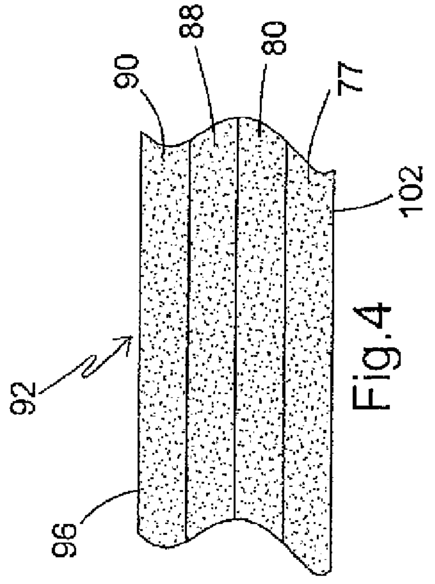
FIG. 4 is a fragmentary vertical section of a structural cementitious panel produced according to the present procedure.

Referring now to FIGS. 1 and 4, with each successive layer of settable slurry and fibers, an additional slurry feeder station 44, 78 followed by a fiber chopper 36, 66, 82 and an embedment device 70, 86 is provided on the production line 10. In the preferred embodiment, four total layers 77, 80, 88, 90 are provided to form the SCP panel 92. Upon the disposition of the four layers of fiber-embedded settable slurry as described above, a forming device 94 (FIG. 1) is preferably provided to the frame 12 to shape an upper surface 96 of the panel 92. Such forming devices 94 are known in the settable slurry/board production art, and typically are spring-loaded or vibrating plates which conform the height and shape of the multi-layered panel to suit the desired dimensional characteristics. An important feature of the present invention is that the panel 92 consists of multiple layers 77, 80, 88, 90 which upon setting, form an integral, fiber-reinforced mass. Provided that the presence and placement of fibers in each layer are controlled by and maintained within certain desired parameters as is disclosed and described below, it will be virtually impossible to delaminate the panel 92 produced by the present process.

At this point, the layers of slurry have begun to set, and the respective panels 92 are separated from each other by a cutting device 98, which in the preferred embodiment is a water jet cutter. Other cutting devices, including moving blades, are considered suitable for this operation, provided that they can create suitably sharp edges in the present panel composition. The cutting device 98 is disposed relative to the line 10 and the frame 12 so that panels are produced having a desired length, which may be different from the representation shown in FIG. 1. Since the speed of the carrier web 14 is relatively slow, the cutting device 98 may be mounted to cut perpendicularly to the direction of travel of the web 14. With faster production speeds, such cutting devices are known to be mounted to the production line 10 on an angle to the direction of web travel. Upon cutting, the separated panels 92 are stacked for further handling, packaging, storage and/or shipment as is well known in the art.

Figure 5:
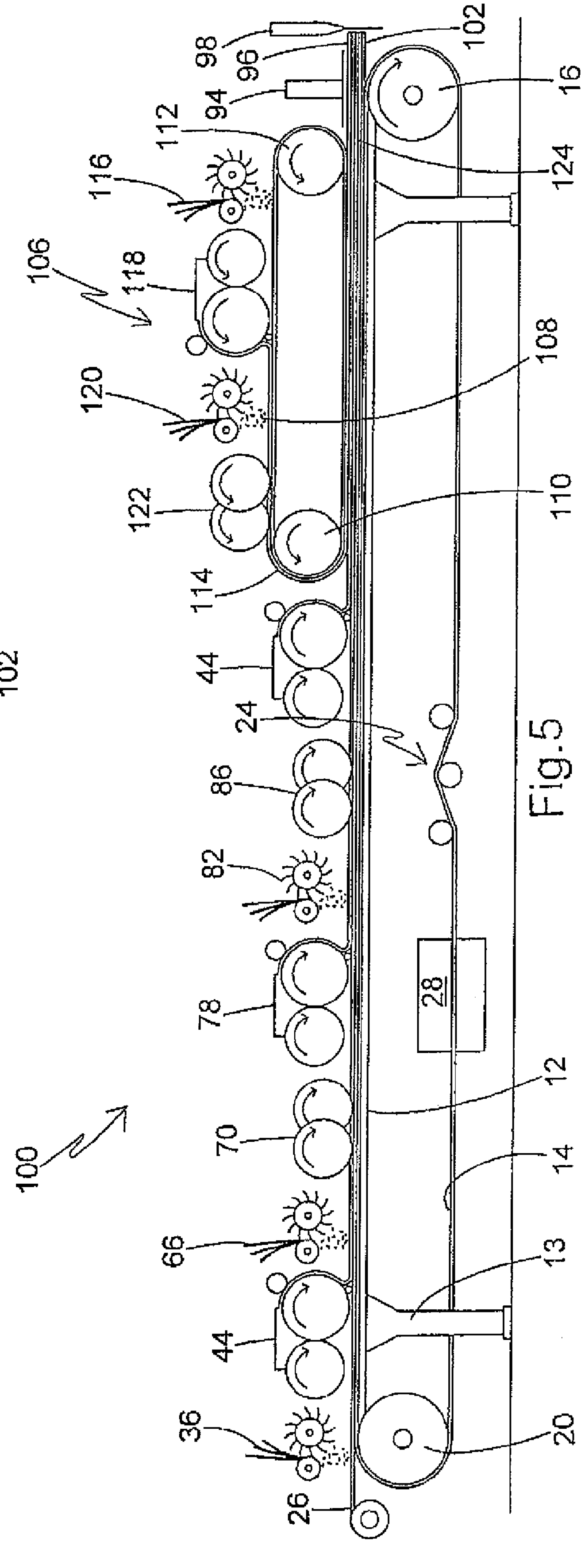
FIG. 5 is a diagrammatic elevational view of an alternate apparatus used to practice an alternate process to that embodied in FIG. 1.

Referring now to FIGS. 4 and 5, an alternate embodiment to the production line 10 is generally designated 100. The line 100 shares many components with the line 10, and these shared components have been designated with identical reference numbers. The main difference between the line 100 and the line 10 is that in the line 100, upon creation of the SCP panels 92, an underside 102 or bottom face of the panel will be smoother than the upper side or top face 96, even after being engaged by the forming device 94. In some cases, depending on the application of the panel 92, it may be preferable to have a smooth face and a relatively rough face. However, in other applications, it may be desirable to have a board in which both faces 96, 102 are smooth. Since the smooth texture is generated by the contact of the slurry with the smooth carrier 14 or the carrier web 26, to obtain a SCP panel with both faces or sides smooth, both upper and lower faces 96, 102 need to be formed against the carrier 14 or the release web 26.

To that end, the production line 100 includes sufficient fiber chopping stations 36, 66, 82, slurry feeder stations 44, 78 and embedment devices 70, 86 to produce at least three layers 77, 80 and 88. Additional layers may be created by repetition of stations as described above in relation to the production line 10. However, in the production line 100, in the production of the last layer of the SCP panel, an upper deck 106 is provided having a reverse rotating web 108 looped about main rolls 110, 112 (one of which is driven) which deposits a layer of slurry and fibers 114 with a smooth outer surface upon the moving, multi-layered slurry 46.

More particularly, the upper deck 106 includes an upper fiber deposition station 116 similar to the fiber deposition station 36, an upper slurry feeder station 118 similar to the feeder station 44, a second upper fiber deposition station 120 similar to the chopping station 66 and an embedment device 122 similar to the embedment device 70 for depositing the covering layer 114 in inverted position upon the moving slurry 46. Thus, the resulting SCP panel 124 has smooth upper and lower surfaces 96, 102.

Another feature of the present invention is that the resulting SCP panel 92, 124 is constructed so that the fibers 30, 68, 84 are uniformly distributed throughout the panel. This has been found to enable the production of relatively stronger panels with relatively less, more efficient use of fibers. The percentage of fibers relative to the volume of slurry in each layer preferably constitutes approximately in the range of 1.5% to 3% by volume of the slurry layers 77, 80, 88, 90, 114.

In quantitative terms, the influence of the number of fiber and slurry layers, the volume fraction of fibers in the panel, and the thickness of each slurry layer, and fiber strand diameter on fiber embedment efficiency has been investigated and established as part of this invention. In the analysis, the following parameters were identified:

$v_T$=Total composite volume $v_s$=Total panel slurry volume $v_f$=Total panel fiber volume $v_{f,l}$=Total fiber volume/layer $v_{T,l}$=Total composite volume/layer $v_{s,l}$=Total slurry volume/layer $N_l$=Total number of slurry layers; Total number of fiber layers $V_f$=Total panel fiber volume fraction $d_f$=Equivalent diameter of individual fiber strand $l_f$=Length of individual fiber strand t=Panel thickness $t_l$=Total thickness of individual layer including slurry and fibers $t_{s,l}$=Thickness of individual slurry layer $n_{f,l}$, $n_{f1,l}$, $n_{f2,l}$=Total number of fibers in a fiber layer $s_{f,l}^P$, $s_{f,l}^P$, $s_{f2,l}^P$=Total projected surface area of fibers contained in a fiber layer $S_{f,l}^P$, $S_{f1,l}^P$, $S_{f2,l}^P$=Projected fiber surface area fraction for a fiber layer.

Projected Fiber Surface Area Fraction, $S_{f,l}^P$

Assume a panel composed of equal number of slurry and fiber layers. Let the number of these layers be equal to $N_l$, and the fiber volume fraction in the panel be equal to $V_f$.

Total composite volume=Total slurry volume+Total fiber volume $$v_T=v_s+v_f \tag{1}$$

Total composite volume/layer=Total slurry volume/layer+Total fiber volume/layer $$\frac{v_T}{N_l}=\frac{v_s}{N_l}+\frac{v_f}{N_l} \tag{2}$$

$$v_{T,l}=v_{s,l}+v_{f,l} \tag{3}$$

where, $v_{T,l}=v_t/N_l$; $v_{s,l}=v_s/N_t$; $v_{f,l}=v_f/N_l$

Assuming that all fiber layers contain equal amount of fibers, the total fiber volume/layer, $v_{f,l}$ is equal to $$v_{f,l}=\frac{v_T*V_f}{N_l} \tag{4}$$

Assuming fibers to have cylindrical shape, total number of fiber strands/layer, $n_{f,l}$ is equal to:

$$n_{f,l}=\frac{\frac{v_T*V_f}{N_l}}{\frac{\pi d^2}{4}*l_f}=\frac{4v_TV_f}{\pi d_f^2 l_f N_l} \tag{5}$$

where, $d_f$ is the equivalent fiber strand diameter.

The projected surface area of a cylindrical fiber is equal to the product of its length and diameter. Therefore, the total projected surface area of all fibers contained in a fiber layer is equal to $$s_{f,l}^P=n_{f,l}*d_f*l_f=\frac{4v_TV_f}{N_l\pi d_f} \tag{6}$$

Projected fiber surface area fraction, $S_{f,l}^P$ is defined as follows:

$$S_{f,l}^P=\frac{\text{Projected surface area of fibers/layer, } s_{f,l}^P}{\text{Projected surface area of the slurry layer, } s_{s,l}^P} \tag{7}$$

-continued $$S^P_{f,l} = \frac{\frac{4v_T V_f}{N_l \pi d_f}}{\frac{v_{s,l}}{t_{s,l}}} = \frac{\frac{4v_T V_f}{N_l \pi d_f}}{\frac{v_T}{t}\left(=\frac{v_{s,l}}{t_{s,l}}=\frac{v_{T,l}}{t_l}\right)} = \frac{4V_f t}{\pi N_l d_f}$$

where, $t_{s,l}$ and $v_{s,l}$ are the thickness and volume of the individual slurry layer, respectively.

Thus, the projected fiber surface area fraction, $S_{f,l}^P$ can be written as:

$$S^P_{f,l} = \frac{4V_f t}{\pi N_l d_f} \tag{8}$$

The projected fiber surface area fraction, $S_{f,l}^P$ can also be derived in the following form from Equation 7 as follows:

$$S^P_{f,l} = \frac{\frac{4v_T V_f}{N_l \pi d_f}}{\frac{v_{s,l}}{t_{s,l}}} = \frac{\frac{4v_T V_f}{N_l \pi d_f}}{\frac{(1-V_f)*v_T}{N_l} * \frac{1}{t_{s,l}}} = \frac{4V_f * t_{s,l}}{\pi d_f (1-V_f)} = \frac{4V_f * t_l}{\pi d_f} \tag{9}$$

where, $t_{s,l}$ is the thickness of distinct slurry layer and $t_l$ is the thickness of the individual layer including slurry and fibers.

Thus, the projected fiber surface area fraction, $S_{f,l}^P$ can also be written as:

$$S^P_{f,l} = \frac{4V_f * t_{s,l}}{\pi d_f (1-V_f)} \tag{10}$$

Equations 8 and 10 depict dependence of the parameter projected fiber surface area fraction, $S_{f,l}^P$ on several other variables in addition to the variable total fiber volume fraction, $V_f$.

In summary, the projected fiber surface area fraction, $S_{f,l}^P$ of a layer of fiber network being deposited over a distinct slurry layer is given by the following mathematical relationship:

$$S^P_{f,l} = \frac{4V_f t}{\pi N_l d_f} = \frac{4V_f * t_{s,l}}{\pi d_f (1-V_f)}$$

where, $V_f$ is the total panel fiber volume fraction, t is the total panel thickness, $d_f$ is the diameter of the fiber strand, $N_l$ is the total number of fiber layers and $t_{s,l}$ is the thickness of the distinct slurry layer being used. A discussion analyzing contribution of these variables on the parameter projected fiber surface area fraction, $S_{f,l}^P$ is given below:

The projected fiber surface area fraction, $S_{f,l}^P$ is inversely proportional to the total number of fiber layers, $N_l$. Accordingly, for a given fiber diameter, panel thickness and fiber volume fraction, an increase in the total number of fiber layers, $N_l$, lowers the projected fiber surface area fraction, $S_{f,l}^P$ and vice-versa.

The projected fiber surface area fraction, $S_{f,l}^P$ is directly proportional to the thickness of the distinct slurry layer thickness, $t_{s,l}$. Accordingly, for a given fiber strand diameter and fiber volume fraction, an increase in the distinct slurry layer thickness, $t_{s,l}$, increases the projected fiber surface area fraction, $S_{f,l}^P$ and vice-versa.

The projected fiber surface area fraction, $S_{f,l}^P$ is inversely proportional to the fiber strand diameter, $d_f$. Accordingly, for a given panel thickness, fiber volume fraction and total number of fiber layers, an increase in the fiber strand diameter, $d_f$, lowers the projected fiber surface area fraction, $S_{f,l}^P$ and vice-versa.

The projected fiber surface area fraction, $S_{f,l}^P$ is directly proportional to volume fraction of the fiber, $V_f$. Accordingly, for a given fiber panel thickness, fiber strand diameter and total number of fiber layers, the projected fiber surface area fraction, $S_{f,l}^P$ increases in proportion to increase in the fiber volume fraction, $V_f$ and vice-versa.

The projected fiber surface area fraction, $S_{f,l}^P$ is directly proportional to the total panel thickness, t. Accordingly, for a given fiber strand diameter, fiber volume fraction and total number of fiber layers, increase in the total panel thickness, t, increases the projected fiber surface area fraction, $S_{f,l}^P$ and vice-versa.

Experimental observations confirm that the embedment efficiency of a layer of fiber network laid over a cementitious slurry layer is a function of the parameter "projected fiber surface area fraction". It has been found that the smaller the projected fiber surface area fraction, the easier it is to embed the fiber layer into the slurry layer. The reason for good fiber embedment efficiency can be explained by the fact that the extent of open area or porosity in a layer of fiber network increases with decrease in the projected fiber surface area fraction. With more open area available, the slurry penetration through the layer of fiber network is augmented, which translates into enhanced fiber embedment efficiency.

Accordingly, to achieve good fiber embedment efficiency, the objective function becomes keeping the fiber surface area fraction below a certain critical value. It is noteworthy that by varying one or more variables appearing in the Equations 8 and 10, the projected fiber surface area fraction can be tailored to achieve good fiber embedment efficiency.

Different variables that affect the magnitude of projected fiber surface area fraction are identified and approaches have been suggested to tailor the magnitude of "projected fiber surface area fraction" to achieve good fiber embedment efficiency. These approaches involve varying one or more of the following variables to keep projected fiber surface area fraction below a critical threshold value: number of distinct fiber and slurry layers, thickness of distinct slurry layers and diameter of fiber strand.

Based on this fundamental work, the preferred magnitudes of the projected fiber surface area fraction, $S_{f,l}^P$ have been discovered to be as follows:

| | |
|---|---|
| Preferred projected fiber surface area fraction, $S_{f,l}^P$ | <0.65 |
| Most preferred projected fiber surface area fraction, $S_{f,l}^P$ | <0.45 |

For a design panel fiber volume fraction, $V_f$, achievement of the aforementioned preferred magnitudes of projected fiber surface area fraction can be made possible by tailoring one or more of the following variables—total number of distinct fiber layers, thickness of distinct slurry layers and fiber strand diameter. In particular, the desirable ranges for these variables that lead to the preferred magnitudes of projected fiber surface area fraction are as follows:

| Thickness of Distinct Slurry Layers, $t_{s,l}$ | |
|---|---|
| Preferred thickness of distinct slurry layers, $t_{s,l}$ | ≦0.20 inches |
| More Preferred thickness of distinct slurry layers, $t_{s,l}$ | ≦0.12 inches |
| Most preferred thickness of distinct slurry layers, $t_{s,l}$ | ≦0.08 inches |
| **Number of Distinct Fiber Layers, $N_l$** | |
| Preferred number of distinct fiber layers, $N_l$ | ≧4 |
| Most preferred number of distinct fiber layers, $N_l$ | ≧6 |
| **Fiber Strand Diameter, $d_f$** | |
| Preferred fiber strand diameter, $d_f$ | ≧30 tex |
| Most preferred fiber strand diameter, $d_f$ | ≧70 tex |

While a particular embodiment of the multi-layer process for producing high strength fiber-reinforced structural cement panels has been shown and described, it will be appreciated by those skilled in the art that changes and modifications may be made thereto without departing from the invention in its broader aspects and as set forth in the following claims.

What is claimed is:

1. An apparatus for producing a multi-layered structural cementitious panel, comprising:

a conveyor-type frame supporting a moving web;

a first loose fiber distribution station in operational relationship to said frame and configured for depositing loose fibers upon said moving web;

a first slurry feed station in operational relationship to said frame and configured for depositing a thin layer of settable slurry upon said moving web so that said fibers are covered;

a second loose fiber distribution station in operational relationship to said frame and configured for depositing loose fibers upon said slurry;

an embedment device in operational relationship to said frame and configured for generating a kneading action in said slurry to embed said fibers into said slurry; and additional sequences of said slurry feed station, said second loose fiber distribution station and said embedment device provided in operational relationship to said frame in sequence to provide a structural cementitious panel having multiple layers, each of which with embedded fibers.

2. The apparatus of claim 1 further including a cutting device for separating panels produced on said frame.

3. The apparatus of claim 1 further including a second moving web disposed above said web and moving in an opposite direction, said second moving web being provided with an upper fiber deposition station; an upper slurry feed station; a second upper fiber deposition station; and an embedment device for depositing a covering layer in inverted position upon said moving slurry.

4. The apparatus of claim 1 wherein said fiber distribution stations are configured collectively to provide a total panel fiber volume fraction $V_f$; said slurry feed stations and said loose fiber distribution stations are configured to provide layers of thickness $t_{s,l}$, and wherein a projected fiber surface area fraction:

$$S^P_{f,l} = \frac{4V_f * t_{s,l}}{\pi d_f(1 - V_f)}$$

is maintained at less than 0.65 when using a fiber having a fiber diameter of $d_f$.

* * * * *

UNITED STATES PATENT AND TRADEMARK OFFICE

CERTIFICATE OF CORRECTION

PATENT NO. : 7,789,645 B2
APPLICATION NO. : 12/133657
DATED : September 7, 2010
INVENTOR(S) : Dubey et al.

It is certified that error appears in the above-identified patent and that said Letters Patent is hereby corrected as shown below:

col. 8, line 28, in the second equation, delete "$v_{s,l}=v_s/N_t$" and replace with with --$v_{s,l}=v_s/N_l$ --.

Signed and Sealed this
Third Day of January, 2012

David J. Kappos
*Director of the United States Patent and Trademark Office*